United States Patent Office 2,894,015
Patented July 7, 1959

2,894,015

FUNGICIDAL COMPOSITIONS AND THEIR USE

Glendon D. Kyker, Chattanooga, Tenn., assignor to Pennsalt Chemicals Corporation, a corporation of Pennsylvania No Drawing. Application March 30, 1956
Serial No. 574,963

9 Claims. (Cl. 260—461)

This invention relates to control of fungi and to methods and compositions for protecting materials, particularly organic materials, against attack by fungi. The invention also relates to new highly halogenated organic compounds which are employed as active ingredients of compositions prepared for use in the control of fungi and to processes for preparing the active ingredients and compositions containing the same.

It is an object of this invention to provide compositions of outstanding value in protecting organic material, both in the natural and artificial state, by means of compositions which are highly effective in controlling economically harmful fungi which attack organic material. A further object is to provide fungicidal compositions which contain, as an essential ingredient thereof, the reaction product obtained by reacting a pentahalophenate with a phosphorus oxyhalide, obtaining thus a highly halogenated product having the empirical formula $C_{24}X_{20}O_7P_2$ in which X is a halogen, e.g., fluorine, chlorine, bromine or iodine.

A still further object is to provide compositions which are highly effective, at very low concentrations of active ingredient, in killing fungi or preventing or inhibiting their growth. Another object of the invention is to treat agricultural materials, whether in the natural or fabricated state, with a compound of this invention, thereby both disinfecting and preserving such agricultural products. These and other objects will be apparent from this specification.

In the practice of this invention there is applied to the material which is to be protected against attack by fungi a highly halogenated compound having the empirical formula $C_{24}X_{20}O_7P_2$, in which X is halogen, believed to be tetrakis (pentahalophenyl) pyrophosphate and to have the structural formula

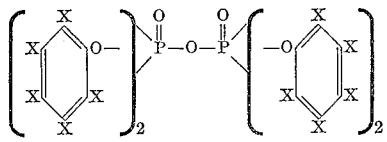

The novel highly halogenated compound used as the active ingredient in the practice of this invention is conveniently prepared by adding a phosphorus oxyhalide to a 25–35% by weight solution of an alkali metal pentahalophenate in an organic solvent, xylene, for example, in the ratio of 1 part of phosphorus oxyhalide to 5–6 parts by weight of the alkali metal pentahalophenate; heating the reaction mass in the temperature range from about 65° C. to the refluxing temperature of the solvent for from 1 to 24 hours; filtering the reaction mass, recovering the reaction product as solid particles from the filtrate; washing the recovered solids with a 5–10% aqueous solution of alkali and water, and drying.

The process for preparing the active ingredient is illustrated by the following example in which the halogen of the highly halogenated compound prepared is chlorine. The parts are by weight unless otherwise stated.

EXAMPLE 1

141.5 parts of anhydrous technical sodium pentachlorophenate were dissolved in about 450 parts of xylene. The solution was heated to its boiling point and refluxed at about 141–142° C. while 26 parts of phosphorus oxychloride were added, slowly to avoid foaming. The mixture was then refluxed for about 2.5 hours at about 137–140° C. It was next cooled to about 100° C. and filtered to remove by-product salt. About 600 parts of absolute methanol were added to the filtrate to cause precipitation of the reaction product from the xylene solution. The mixture was filtered and the solid particles of reaction product recovered. The product mass was washed with about 400 parts of 5% NaOH solution at 70° C. followed by a rinse with about 400 parts of water heated to 70–80° C. The product was dried to constant weight at 70–80° C. 88.5 parts of product were recovered. The product melted in the range 221–231° C. On analysis the product was found to have a chlorine content of 55.8% and a molecular weight of 1100. The empirical formula of the compound was calculated to be $C_{24}Cl_{20}O_7P_2$. Attempts to definitely identify the structure of the compound by infrared spectroscopy were unsuccessful. A portion of the product was recrystallized from the methanol-benzene solution. The recrystallized product was found to melt at 232–238° C.

Following procedures substantially as described in the above example, a compound having the empirical formula $C_{24}F_{20}O_7P_2$ can be prepared from a pentafluorophenate and phosphorus oxyfluoride; a compound having the empirical formula $C_{24}Br_{20}O_7P_2$ can be prepared from a pentabromophenate and phosphorus oxybromide; and a compound having the empirical formula $C_{24}I_{20}O_7P_2$ can be prepared from a pentaiodophenate and phosphorus oxyiodide.

Compounds may also be prepared in which the halogens are mixed, e.g., a pentachlorophenate may be reacted with phosphorus oxybromide to give a compound having the empirical formula $C_{24}Cl_xBr_yO_7P_2$ wherein the sum of $x$ and $y$ is 20.

The fungicidal properties of the highly halogenated compounds of this invention are shown by the following examples in which the chlorine-containing compound is used for illustrative purposes.

EXAMPLE 2

Pieces of cotton muslin fabric were impregnated with solvent solutions of the compound having the empirical formula $C_{24}Cl_{20}O_7P_2$ to provide 0.5, 1.0 and 2.0% of the chemical on the fabric on a weight basis after evaporation of the solvent. Similar test pieces were prepared using pentachlorophenol as the chemical. The latter was used as a standard as it is known to possess good mildew-proofing properties. The treated pieces of fabric were cut to 6" x 1¼" swatches and raveled to 1" in width. The two sets of swatches were divided into lots of ten swatches each for each concentration. Each lot was buried in a flat of soil and held for 28 days at a temperature of 28–30° C. at 100% relative humidity. At the end of the test period the swatches were rinsed in water and dried for three days at 70° F. and 65% relative humidity. The tensile strength of each swatch was determined on a Scott tensile strength testing machine. The results in Table I show the activity and the superiority of the phosphorus oxychloride derivative of pentachlorophenol over its parent compound as a mildew-proofing agent.

Table 1
TENSILE STRENGTH OF MUSLIN AFTER 28 DAYS' SOIL BURIAL

| Chemical | Concentration on Fabric | | |
|---|---|---|---|
| | 2% | 1% | 0.5% |
| | Tensile Strength, p.s.i. | | |
| None | 0 | 0 | 0 |
| Pentachlorophenol | 59.5±1.9 | 10.6±2.5 | 0.9±0.3 |
| $C_{24}H_{20}O_7P_2$ | 60.2±1.0 | 54.4±2.8 | 38.9±3.8 |

EXAMPLE 3

5 parts of the chlorine-containing compound of this invention were mixed with 90 parts of xylene and 5 parts of Triton X-155 to make an emulsifiable concentrate which could be used directly or dispersed in water to form a water dispersion for application to materials or surfaces to be protected from fungi.

EXAMPLE 4

50 parts of the chlorine-containing compound of this invention were blended with 48 parts of a finely divided fuller's earth, 1 part of Igepon AP Extra, and 1 part of sodium lignin sulfonate, all of the solids previously having been milled to pass 200 mesh, and the ingredients blended in a mixer to form a wettable powder suitable for dispersion in water and application to materials and surfaces to be protected against fungus growth.

EXAMPLE 5

The fungicidal properties of the highly halogenated compounds of this invention were further demonstrated by the activity of the chlorine-containing compound against the damping-off fungus *Rhizoctonia solani* which causes rotting of seeds in the soil and lesions on the stems of such crops at cotton. A fungicidal composition was prepared as described in Example 4. An emulsion of the chemical was sprayed into a seed furrow into which the seeds of peas and cotton had been placed. The seeds were covered immediately with soil and allowed to remain in flats on the greenhouse bench until the seedlings emerged. Counts were made on the number of emerged seedlings and on the number of seedlings free of fungus lesions. An application of 10 lbs. per acre of the chemical of this invention gave an average of 57.5% emergence of peas, compared with 0% on untreated seeds, and 88% lesion-free cotton seedlings compared with 42% from untreated seedlings.

EXAMPLE 6

The control of mildewing and rotting of cotton cloth in agar plate tests using the fungus *Chaectomium globosum*, which is common cause of degradation of cellulose, was demonstrated using the chlorine-containing compound of this invention. Cotton muslin strips were dipped in a water dispersion of the chemical to give impregnations of 0.1% and 0.01% by weight of the cloth after drying. The dried cloth strips were placed on the surface of a mineral salts agar (containing no carbon source) in a Petri dish and infested with a suspension of the spores of the fungus. After a suitable incubation period the cloth was examined for mildew growth and the amount of growth compared with untreated control strips, which were completely infected with the organism. The $C_{24}Cl_{20}O_7P_2$ compound gave complete inhibition of the organism even at 0.01% concentration.

It will be understood that my active ingredients may be used individually or in admixtures with each other for the desired purposes.

The active ingredients of this invention may be applied in a variety of ways to materials which are to be protected against attack by microorganisms, such as by dusting, spraying, dipping or tumbling, as best suits the protection problem at hand. They may be used as such in certain cases, but more frequently they are formulated with carriers before application. Carriers may be liquid, for example, water or certain oils, or solid, for example, any of the solid carriers of mixtures thereof more particularly referred to hereinafter.

Compositions may be formulated by mixing the active ingredients with any desired liquid or solid carriers, such as any of the finely divided solid carriers known in the dusting art, which are preferably of large surface area, such as clays, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood as generally identified by trade names (reflecting the source and mode of processing), of which Homer Clay, Celite, and Tripoli may be mentioned as typical.

Non-clay carriers which may be formulated with my active ingredients include, for example, sulfur, volcanic ash, lime products such as hydrated lime and calcium carbonate, by-product lignin, lignocellulose, flours such as wood, walnut shell, wheat, soybean, potato and cotton seed, or any other suitable material employed for similar purposes in the art.

Any desired formulation may be prepared by any suitable method. Thus the active ingredient, preferably in finely divided form if a solid, may be tumbled together with the carrier, or the carrier and the active ingredient may be ground together. Alternatively, the active ingredient in liquid form, including solutions, dispersions, emulsions, and suspensions thereof, may be admixed with the solid carrier in finely divided form in amounts small enough to preserve the free-flowing property of the final dust composition. If desired, excess liquid may be removed, such as by vaporization, for example, under reduced pressure.

When solid compositions are employed, in order to obtain a high degree of coverage with a minimum dosage of the formulation, it is desirable that the formulation be in finely divided form. Preferably, the dust containing the active ingredient should be sufficiently fine that substantially all will pass through a 50 mesh sieve, and more particularly through a 200 mesh sieve. Appreciably larger particle size is less conducive to obtaining an economic application of the material; finer dusts, although they have excellent covering capacity, are somewhat more subject to drift and are more expensive to prepare.

For dusting purposes I prefer a formulation in which the active ingredient is present to the extent of say 10-50% by weight of the total. Such amounts normally give free-flowing products which dust easily. However, these concentrations are only indicative of ranges that give desirable qualities to dusting compositions, and formulations may be made with higher or lower active ingredient content. Thus, compositions containing between say 1% to 99% of active ingredient by weight are contemplated, the remainder being carrier and/or any other additive or adjuvant material which may be desired.

It is often advantageous to add small percentages of wetting agents to dust formulations, such as the wetting agents mentioned hereinafter.

For spray application the active ingredient may be dissolved or dispersed in a liquid carrier, such as water or other suitable liquid.

Aqueous solutions or dispersions are economical, and hence are frequently preferred. In general, the choice of the particular liquid carrier employed will be guided somewhat by prevailing circumstances, such as its availability, its solubility or dispersion characteristics toward the particular active ingredient, and in the case of the treatment of plants, by its toxicity to such plants. In general, water is an excellent liquid carrier, although in the case of the treatment of plants a relatively nonphytotoxic oil, such as diesel oil #2, may at times be preferred.

Thus, spray formulations comprising the active ingredient in the form of a solution, suspension, dispersion, or emulsion, in aqueous or non-aqueous media may be employed.

Emulsions or dispersions of the active ingredient in the liquid carrier may be prepared by agitation of the active ingredient with the carrier. In many instances this is done at the time of spraying. Preferably, however, the agitation should take place in the presence of an emulsifying or dispersing agent (surface-active agent), in order to facilitate the preparation of said emulsion or dispersion. Emulsifying or dispersing agents are well-known in the art, and include, for example, fatty alcohol sulfates, such as sodium lauryl sulfate, aliphatic or aromatic sulfonates, such as sulfonated castor oil or fish oil, or the various alkaryl sulfonates (such as the sodium salt of mono-sulfonated nonyl naphthalene or tertiary dodecyl benzene), or the soaps, such as sodium oleate and sodium stearate, or nonionic types of emulsifying and dispersing agents such as the high molecular weight alkyl polyglycolethers or analogous thioethers such as the decyl, dodecyl, and tetradecyl polyglycolethers and thioethers containing from 25 to 75 carbon atoms. Such emulsifying and dispersing agents, it will be noted, also commonly possess wetting agent properties.

The use, if desired, of adjuvants, such as wetting agents and/or humectants, is also contemplated in connection with solutions, suspensions, dispersions, emulsions, or solid formulations of the active ingredient. Any suitable wetting agent and/or humectant may be employed for this purpose, such as the wetting agents more particularly referred to above.

Examples of humectants are glycerine, diethylene glycol, ethylene glycol, polyethylene glycols generally, and well-known sugars and sugar-containing mixtures, such as glucose, fructose, sucrose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more, based on active ingredient. For mere wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent, these considerations being particularly applicable in the case of the treatment of plants.

It should be noted that after liquid formulations of my active ingredients have been applied to plants, the concentration of wetting agent existing upon such treated plants is in no sense a function of the concentration existing in the original formulation. Thus, evaporation might concentrate the wetting agent considerably, or the presence of dew on plant surfaces, or of plant juices on such surfaces might considerably dilute the wetting agent.

It will of course be understood that wetting agents, particularly when in solid form, may be compounded with solid forms of the active ingredient.

Although the active ingredients of this invention may be applied without dilution to materials which are to be protected against attack by microorganisms, it is usually desirable to employ liquid or solid formulations, for example, formulations such as those discussed above. In the case of liquid formulations, the active ingredient usually constitutes less than 30% by weight of the total, such as less than 10% and even as low as 0.1%.

Other substances than the carrier, surface-active agent, and/or humectant may be included in solid or liquid formulations of the active ingredients, if desired, such other substances including spreaders, stickers, and other auxiliary materials. Active ingredients other than those disclosed herein and compatible with the formulation may be added if desired for any particular purpose. For example, it may at times be expedient to include singly or in combination, substances such as plant response agents, or substances such as fungicides, insecticides, or bactericides other than those agents discussed herein. Also, substances may be added to bring about various physical improvements such as prevention of lumping during storage, etc.

In addition to the treatment of agricultural products generally including growing plants, seeds, etc. for destroying plant disease organisms or preventing or inhibiting their growth, the compositions of this invention are generally useful as fungicides. For example my compositions may be employed advantageously as preservatives for such substances as rawhide, adhesives such as glue, gelatin, leather, cellulosic substances such as cork, wood, cotton, fabric, cordage, etc., wool, ink, casein products and other natural or manufactured products that are subject to attack or decomposition by various fungi.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim:

1. The product having the empirical formula $C_{24}Cl_{20}O_7P_2$ and melting in the range of about 232° C. to about 238° C.

2. The process for preparing tetrakis(pentachlorophenyl)pyrophosphate which comprises reacting 5–6 mole parts of sodium pentachlorophenol in 3–4 parts by weight of xylene with 1 mole part of phosphorus oxychloride, refluxing the mixture for 1 to 24 hours, recovering the reaction product free from the solvent, washing said product with a 5–10% solution of an alkali and water at 70–80° C., and recovering said product.

3. A process for protecting a material from attack by fungi comprising applying to said material an effective amount of tetrakis(pentahalophenyl)pyrophosphate.

4. A process for protecting a material from attack by fungi comprising applying to said material an effective amount of tetrakis(pentachlorophenyl)pyrophosphate.

5. A process for destroying fungi which comprises exposing the same to a lethal concentration of a tetrakis(pentahalophenyl)pyrophosphate.

6. A process for destroying fungi which comprises exposing the same to a lethal concentration of the compound tetrakis(pentachlorophenyl)pyrophosphate.

7. A compound having the structural formula

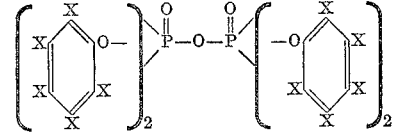

in which X is halogen.

8. Process for preparing tetrakis(pentahalophenyl)pyrophosphate which comprises heating alkali metal pentahalophenate with phosphorus oxyhalide in the temperature range from about 65° C. to about the temperature of reflux.

9. The process of claim 8 wherein the alkali metal pentahalophenate is sodium pentahalophenate.

References Cited in the file of this patent

UNITED STATES PATENTS

| | | |
|---|---|---|
| 2,542,604 | Weisel et al. | Feb. 20, 1951 |
| 2,615,037 | Moyle | Oct. 21, 1952 |